(12) United States Patent
Geibel et al.

(10) Patent No.: US 9,689,475 B2
(45) Date of Patent: Jun. 27, 2017

(54) TENSIONING OR GUIDE RAIL WITH OPENING

(71) Applicant: IWIS MOTORSYSTEME GMBH & CO. KG, Munich (DE)

(72) Inventors: Henning Geibel, Wessling (DE); Renzo Perissinotto, Munich (DE)

(73) Assignee: IWIS MOTORSYSTEME GMBH & CO. KG, Munich (DE)

( * ) Notice: Subject to any disclaimer, the term of this patent is extended or adjusted under 35 U.S.C. 154(b) by 0 days.

(21) Appl. No.: 14/866,456

(22) Filed: Sep. 25, 2015

(65) Prior Publication Data
US 2016/0097440 A1 Apr. 7, 2016

(30) Foreign Application Priority Data

Oct. 2, 2014 (DE) ........................ 10 2014 014 720

(51) Int. Cl.
*F16H 7/18* (2006.01)
*F16H 7/06* (2006.01)
*F16H 7/08* (2006.01)

(52) U.S. Cl.
CPC ................. *F16H 7/18* (2013.01); *F16H 7/08* (2013.01); *F16H 2007/0812* (2013.01); *F16H 2007/0872* (2013.01); *F16H 2007/0893* (2013.01); *F16H 2007/185* (2013.01)

(58) Field of Classification Search
CPC ................. F16H 7/18; F16H 7/08; F16H 7/06
USPC ........................................................ 474/140
See application file for complete search history.

(56) References Cited

U.S. PATENT DOCUMENTS

| 5,180,340 A * | 1/1993 | Vahabzadeh | F16G 13/04 474/111 |
| 5,967,922 A * | 10/1999 | Ullein | F01L 1/02 474/111 |
| 6,302,816 B1 * | 10/2001 | Wigsten | F16H 7/18 474/111 |
| 6,358,169 B1 * | 3/2002 | Markley | F02B 67/06 474/111 |
| 6,375,587 B1 | 4/2002 | Wigsten | |

(Continued)

FOREIGN PATENT DOCUMENTS

DE 195 36 643 A1 4/1997
DE 197 19 732 C1 11/1998
(Continued)

*Primary Examiner* — Michael Mansen
*Assistant Examiner* — Mark K Buse
(74) *Attorney, Agent, or Firm* — Baker & Hostetler LLP

(57) ABSTRACT

A tensioning or guide rail for a chain drive, in particular for a chain drive of an internal combustion engine, comprises two spaced-apart contact sections and one non-contact section arranged therebetween, the contact sections each having a sliding surface which is adapted to be brought into contact with a chain, and the non-contact section interconnecting the two contact sections as a support structure. Such a rail is to be configured such that the installation space available can be utilized more advantageously. To this end, the support structure of the non-contact section comprises an opening extending continuously from a front to a rear of the tensioning or guide rail and separating the contact sections provided with the sliding surfaces. The invention also relates to an endless drive of the type in question.

13 Claims, 5 Drawing Sheets

(56) References Cited

U.S. PATENT DOCUMENTS

| | | | |
|---|---|---|---|
| 9,115,787 B2* | 8/2015 | Kato | F16H 7/08 |
| 9,273,759 B2* | 3/2016 | Kato | F16H 7/18 |
| 2008/0113837 A1* | 5/2008 | Ketterl | F01L 1/022 |
| | | | 474/140 |
| 2009/0036242 A1 | 2/2009 | Hayami et al. | |
| 2011/0294612 A1* | 12/2011 | Kato | F16H 7/08 |
| | | | 474/91 |
| 2013/0053197 A1* | 2/2013 | Konno | F16H 7/18 |
| | | | 474/140 |
| 2014/0179472 A1* | 6/2014 | Kato | F16H 7/18 |
| | | | 474/111 |

FOREIGN PATENT DOCUMENTS

| | | |
|---|---|---|
| DE | 10 2007 026 939 A1 | 12/2008 |
| DE | 10 2008 028 206 A1 | 2/2009 |
| EP | 0 877 179 A1 | 11/1998 |
| WO | 2011/056719 A2 | 5/2011 |

* cited by examiner

TENSIONING OR GUIDE RAIL WITH OPENING

CROSS-REFERENCE TO RELATED APPLICATION

This application claims priority to foreign German patent application No. DE 10 2014 014 720.7, filed on Oct. 2, 2014, the disclosure of which is incorporated by reference in its entirety.

FIELD OF THE INVENTION

The present invention relates to a tensioning or guide rail for a chain drive, in particular for a chain drive of an internal combustion engine, comprising two spaced-apart contact sections and one non-contact section arranged therebetween, the contact sections each having a sliding surface, which is adapted to be brought into contact with a chain, and the non-contact section interconnecting the two contact sections as a support structure.

BACKGROUND

A guide rail of the above-mentioned type is known e.g. from DE 19719732 C1. The slide rail described there is in contact with the tight span of a timing drive of an internal combustion engine and comprises two spaced-apart slide portions connected to a common support arranged therebetween. Each of the slide portions is provided with a sliding lining made of polyamide without any additions of fibers. The support is double T-shaped in cross-section so as to be sufficiently strong in the direction of the contact force. The support can preferably consist of a highly loadable polyamide with additions of fibers. The background of this structural design is a reduction of weight and of the amount of material used for a slide rail.

Another slide rail having spaced apart slide portions is known from DE 102007026939 A1. The slide rail is here formed as an integral component that can be produced with little expenditure. Due to the recessed sections provided between the slide portions, a reduction of friction is accomplished.

These structural designs reduce friction on the one hand and result in a reduction of the amount of material used on the other. However, due to downsizing of internal combustion engines, installation space conditions which make it difficult to accommodate such tensioning and guide rails occur more and more often.

SUMMARY OF THE INVENTION

It is therefore the object of the present invention to produce a low-friction tensioning or guide rail for which a small amount of material suffices and which can be placed advantageously as regards installation space.

According to the present invention, this object is achieved in the case of a tensioning or guide rail of the generic kind in that the support structure of the non-contact section comprises an opening extending continuously from a front to a rear of the tensioning or guide rail and separating the contact sections provided with the sliding surfaces. The support structure of the non-contact section can thus be constructed to be very narrow or it may have a cutout (opening) in the area of which adjoining components or extraneous contours, such as the engine block housing etc., may extend into the area of the support structure of the non-contact section and can thus approach the chain comparatively closely. Hence, a tensioning or guide rail having this kind of structural design can be placed very close to these extraneous contours or additional components also in the area of its non-contact section. In principle, only a minimum distance to the chain must be observed in this area, which allows for the chain oscillations occurring under load. In addition, the chain can be guided such that the force transmitted from the chain to the rail is concentrated in limited areas. These areas may be specially reinforced. On the other hand, the load on a specific area of the rail can be reduced in this way, so that the chain can approach the engine contour very closely.

According to a preferred embodiment, the support structure of the non-contact section may be configured as at least one cheek connected to the contact sections and guided, at least partially, along the sliding surfaces at the side thereof. Depending on the installation space conditions, a single lateral cheek may be provided or, according to a further embodiment, two spaced-apart cheeks may be provided, between which part of the sliding surfaces of the contact sections are arranged, so that the opening defines a window. The cheeks have a very large cross-section in the direction of load, but they may be comparatively thin in the width direction of the tensioning or guide rail. Comparatively large openings can thus be created, which provide particularly advantageous installation conditions. The cheeks may additionally also be used for laterally guiding the chain. Sufficiently high cheeks provide a good bending stiffness of the rail.

For an optimum absorption of force, each of the sliding surfaces preferably exhibits a convex curvature in the direction of movement of the chain. Due to the spaced-apart contact sections, the resultant normal force acting on the rail can be divided onto two areas. The curvature can ensure that the force will then be optimally introduced in the contact sections and directed onto fastening points. In addition, the curvature will ensure optimum meshing and exiting of the chain. The opening is normally provided at a distance below a tangent applied to the two contact sections, i.e. the contact sections curve sectionwise in the direction of the opening.

According to another embodiment, there may be provided a support body, which comprises support structures of the contact sections as well as the support structure of the non-contact section, and two sliding lining bodies connected to the support body and providing the respective sliding surface. Both the support body and the sliding lining body can thus be optimally adapted to their respective functional purpose. The materials used for the support body will primarily be chosen under the aspect of their strength, e.g. metals, such as steel, or fiber-reinforced plastics, and the sliding lining bodies will primarily be chosen under the aspect of their sliding characteristics, e.g. polyamide without any fiber reinforcement or PTFE.

Accordingly, the support body may, as mentioned above, consist of a reinforced plastic material and the sliding linings may be produced from a low-friction plastic material.

According to one variant, the cheek(s) may be configured in an arcuate shape having the same direction of curvature as the sliding surface. This arcuate shape of the cheeks leads to a bend-proof construction and, in addition, it offers the advantage that, in the middle area of the rail, said rail can extend in close proximity to e.g. an engine contour, also due to the fact that the cheeks are preferably convex on the inner side. This structural design provides advantages in addition to those provided by the also existing opening.

The advantages accomplished with respect to the installation space will become particularly noticeable when the length of the opening corresponds to the length of the tensioning or guide rail in a range of 0.2 to 0.5 times, preferably 0.3 to 0.35 times. Therefore, the rail is preferably subdivided into three sections of approximately identical length, viz. the two contact sections and the non-contact section arranged therebetween. In this way, a very good compromise between strength and low weight as well as a good adaptability to the installation space are obtained.

Furthermore, said rail may have a meshing side and an exit side, a height of the cheek(s) increasing continuously from the meshing side to the exit side, at least in the area between the contact sections. The terms meshing side and exit side relate to the sliding direction of the chain along the respective rail, since the chain moves from the meshing side to the exit side. This structural design allows for the increasing chain forces on the rail and represents an appropriate optimization and adaptation to the force conditions.

According to an advantageous embodiment, two spaced-apart fastening points or a fastening point and a support point may be provided, at least one of the two points being arranged centrally, when seen substantially in the longitudinal direction, on the respective associated contact section. The term fastening points relates here to the center points or central axes of the respective fastening facility (opening, fastening bolt, etc.). The substantially central arrangement on the contact section results in an optimum introduction of force into the fastening point. Normally, the fastening point is located approximately on a radius of curvature of the associated curvature of the sliding surface.

The present invention also relates to an endless drive, in particular a chain drive of an internal combustion engine, comprising at least two sprockets, a chain wrapped around the sprockets, and at least one tensioning or guide rail according to one of the claims 1 to 11. Such an endless drive may have constricted installation space conditions, but it will still be able to accommodate a tensioning or guide rail according to the present invention in an elegant manner.

According to a preferred embodiment, the tensioning or guide rail may be arranged at a narrow place, so that, in the area of the opening, a stationary component (or an extraneous contour) approaches the chain in a range of from 5 to 15 mm. The decisive aspect with respect to the distance to be observed is a possibly occurring oscillation of the chain in this section, so that the chain will be prevented from striking against the stationary component. Depending on the distance of the two contact sections, a placement in even closer proximity would also be possible.

According to an advantageous embodiment, the tensioning or guide rail may have arranged thereon two fastening points or a fastening point and a support point, an imaginary connecting line of these points intersecting the stationary component. Thus, it is possible for the stationary component to project into the area of the rail. Provided that the rail has a suitable shape, it may also be guided approximately arcuately around a protruding contour of the component.

BRIEF DESCRIPTION OF THE DRAWINGS

In the following, an embodiment of the present invention will be explained in more detail making reference to drawings, in which.

DETAILED DESCRIPTION

Figure 1:
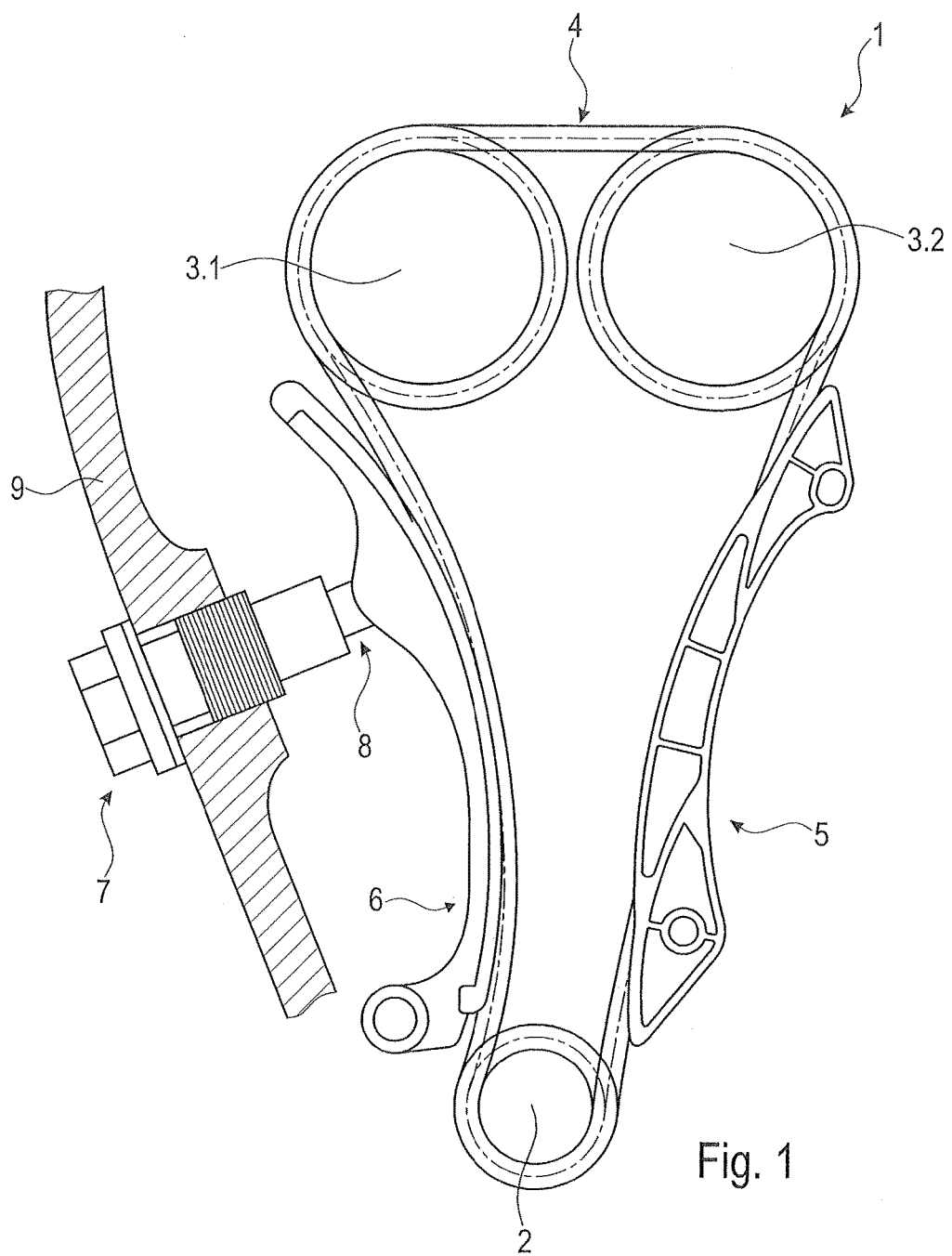
FIG. 1 shows a schematic front view of a timing chain drive.
Figure 2:
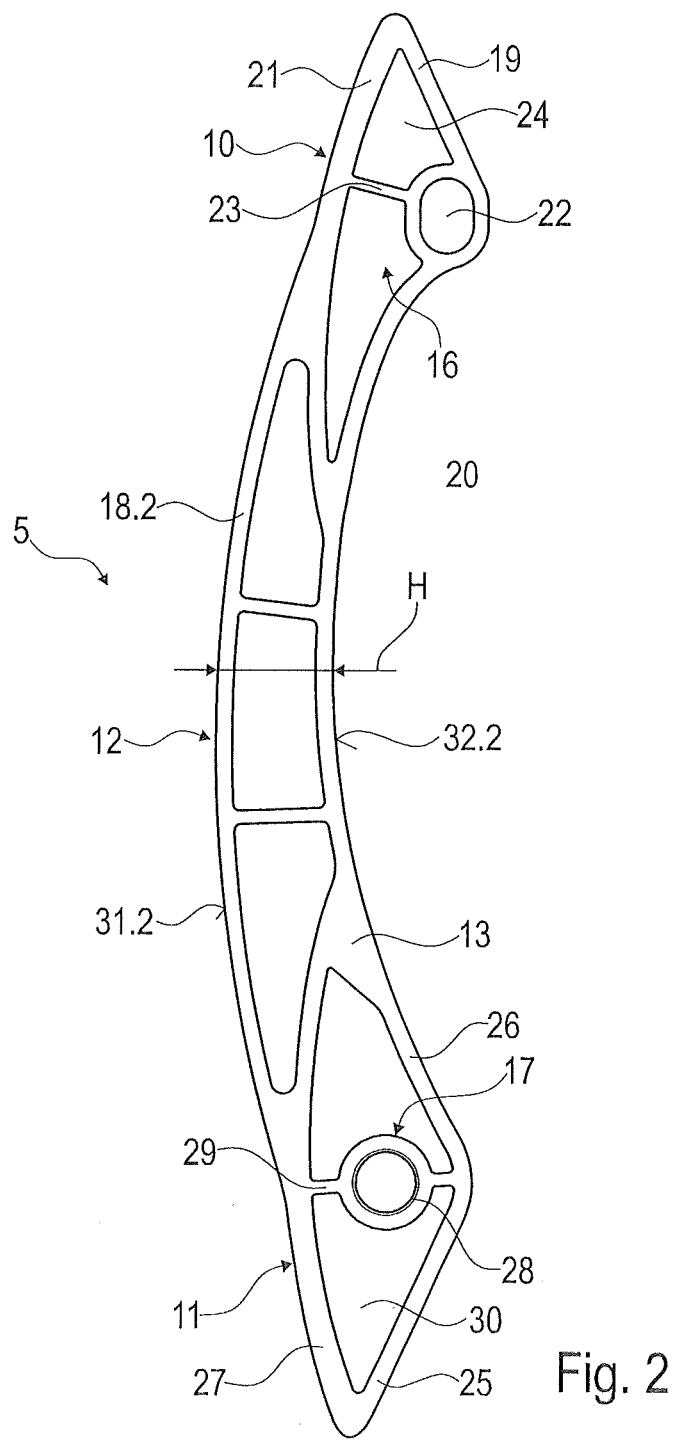
FIG. 2 shows a guide rail according to the present invention in a side view.
Figure 3:
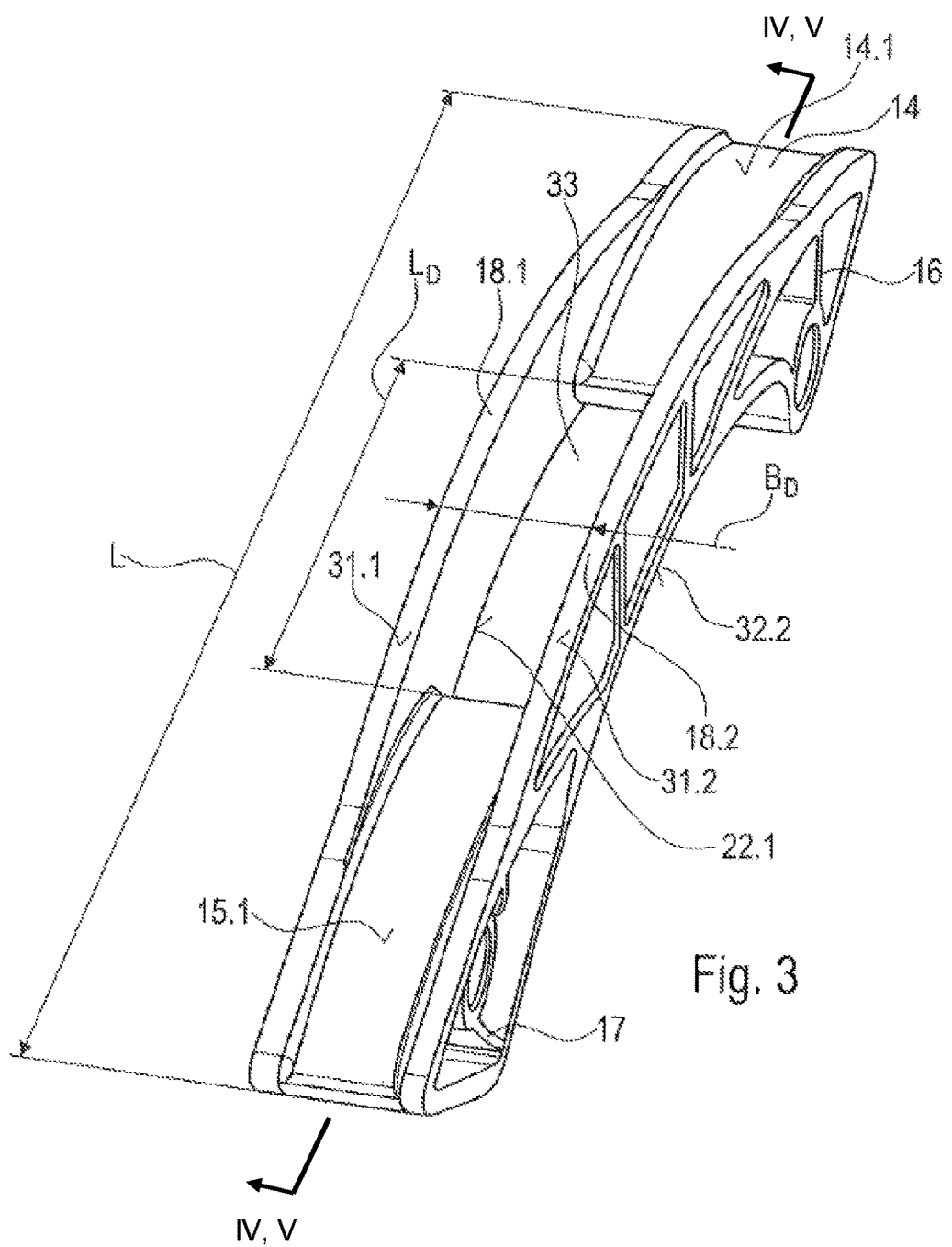
FIG. 3 shows the guide rail according to FIG. 2 in a perspective top view.

The timing chain drive 1 for an internal combustion engine shown in FIG. 1 substantially comprises a crankshaft sprocket 2, two juxtaposed camshaft sprockets 3.1 and 3.2, a timing chain 4 wrapped around said sprockets, a guide rail 5 secured to the engine housing, a tensioning rail 6 pivotably supported on the engine housing and a chain tensioner 7 that applies pressure to the tensioning rail 6 via its tensioning piston 8. In the present case, the chain tensioner 7 is configured as a so-called screw-in chain tensioner, which is screwed into a wall 9 on the engine housing. The chain tensioner 7 may, however, also be configured as a flange- or attachment-type chain tensioner. The crankshaft sprocket 2 drives the two camshaft sprockets 3.1 and 3.2 by means of the timing chain 4. In the course of this process, the tight span of the chain 4 slides along the guide rail 5 and the slack span slides along the tensioning rail 6. The chain tensioner 7 must apply a sufficiently strong force to the tensioning rail 6 so that reliable tensioning of the timing chain 4 will be guaranteed over the whole operating range of the internal combustion engine. Highly dynamic processes will here take place in the interior of the chain tensioner 7, which also provides a damping function.

With the aid of FIGS. 2 to 5, a detailed structural design of an embodiment of a guide rail 5 according to the present invention will be explained in more detail, said guide rail 5 being used in the case of the chain drive according to FIG. 1.

The guide rail 5 is substantially subdivided into three sections, viz. the first contact section 10 on the meshing end of the guide rail 5, the second contact section 11 on the exit end of the guide rail 5 and the non-contact section 12 interconnecting these two contact sections. The guide rail 5 comprises three components. These components are a support body 13, a first sliding lining body 14 on the first contact section 10 and a second sliding lining body 15 on the second contact section 11. The support body 13 is configured as a one-piece component and consists of a fiber-reinforced plastic material. The support body 13 is structurally divided into an approximately triangular support structure 16 of the first contact section 10, an approximately triangular second support structure 17 of the second contact section 11 and two arcuate cheeks 18.1, 18.2 of the non-contact section 12, said cheeks 18.1, 18.2 interconnecting the two support structures 16 and 17. The cheeks 18.1 and 18.2 define the support structure of the non-contact section 12.

The first support structure 16 has a trusslike structural design and comprises a straight end wall 19, a concave rear wall 20 and a convex front wall 21 having arranged thereon the first sliding lining body 14 with its sliding surface 14.1. At the point where the end wall 19 meets the rear wall 20, a fastening eyelet 22 is arranged, whose cross-section has the shape of an elongate hole. A transverse member 23 connects the front wall 21 to the fastening eyelet 22. Approximately in the middle of the width of the guide rail 5, a longitudinally extending support wall 24 is provided, which closes the truss structure of the first support structure 16 with the exception of the fastening eyelet 22.

The second support structure 17 comprises a straight end wall 25, a concave rear wall 26 and a convex front wall 27 carrying the second sliding lining body 15. Approximately in the middle of the second support structure 17, a fastening eyelet 28 is provided, which is circular in cross-section. A transverse member 29 connects the front wall 27 to the fastening eyelet 28 as well as the fastening eyelet 28 to the corner point of the end wall 25 and of the rear wall 26. The truss structure of the second support structure 17 is, approximately centrally, closed by a support wall 30 with the exception of the fastening eyelet 28.

The two cheeks 18.1 and 18.2 each have a convex upper side 31.1 and 31.2 and a concave bottom side 32.1 and 32.2. In total, the cheeks 18.1, 18.2 are arcuate in shape, the height H of the cheeks 18.1 and 18.2 increasing continuously from the meshing side to the exit side of the guide rail 5, at least between the two contact sections 10 and 11. The cheeks 18.1 and 18.2 are configured as bending beams and they are constructed such that they are comparatively narrow but high. In the area between the two contact sections 10 and 11, the two cheeks 18.1 and 18.2 are not connected to one another, so that a windowlike opening 33 is defined. The width $B_D$ of the opening 33 corresponds substantially to the width of the sliding lining bodies 14 and 15 providing the sliding surfaces 14.1 and 15.1 (i.e. it is in the range of 0.9 to 1.2 times the width of the sliding surface 14.1 or 15.1). The length $L_D$ of the opening 33 corresponds approximately to 0.33 times the length L of the guide rail 5 (i.e. it is in the range of 0.2 to 0.5 times the length L of the guide rail 5).

The support body 13 and the two sliding lining bodies 14 and 15 may be interconnected by two-component injection molding. Alternatively, it would also be imaginable to clip on the sliding lining bodies 14 and 15.

Figure 4:
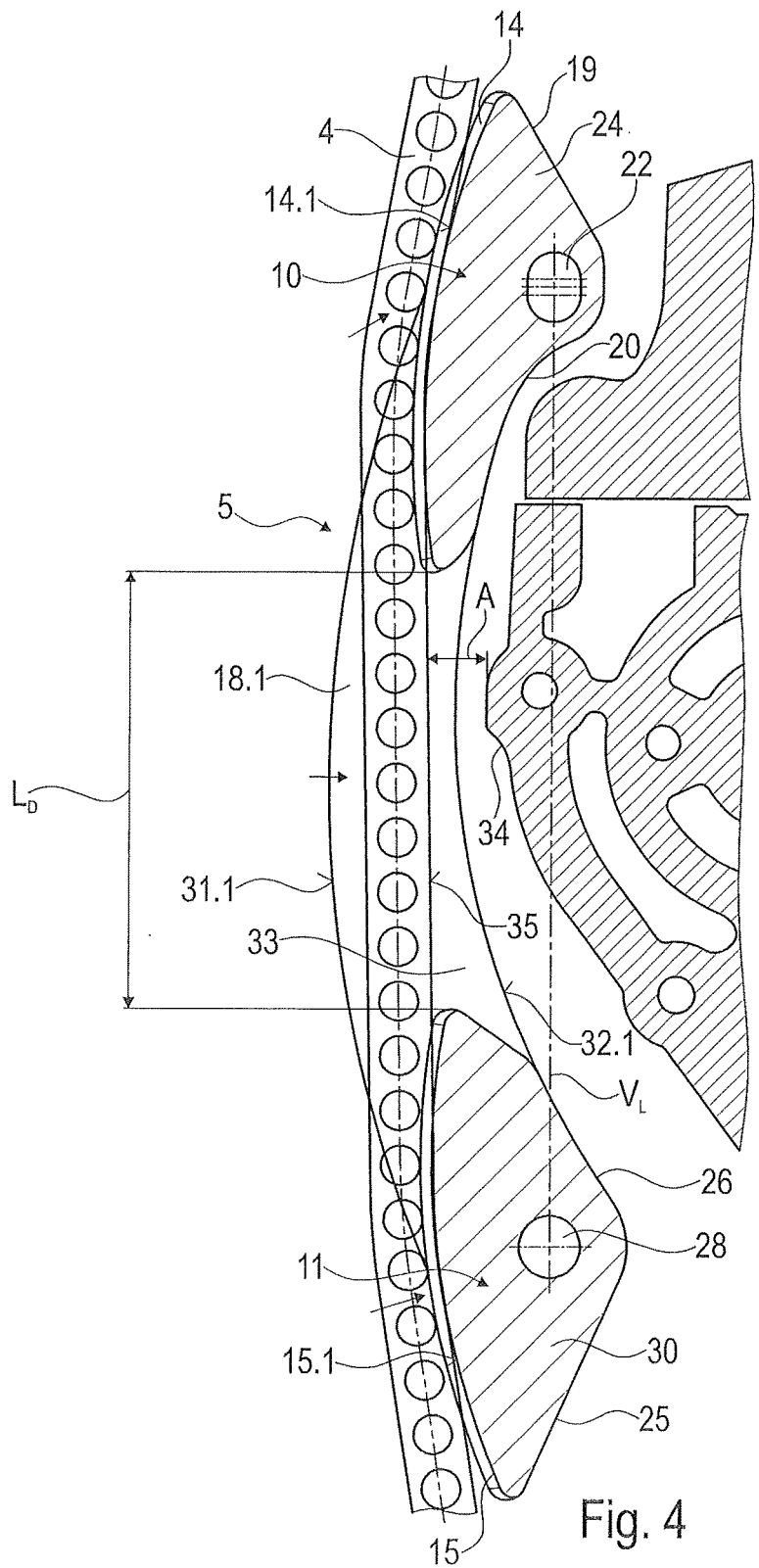
FIG. 4 shows a schematic sectional view of an installation situation of the tensioning rail according to FIG. 2

Making reference to FIG. 4, the effects of the guide rail 5 according to the present invention are now explained in more detail. The arcuate shape of the guide rail 5 comprising the two contact sections 10 and 11 offers, in combination with the intermediate opening 33, the possibility of guiding the guide rail 5 so to speak around housing contours, housing elements and other structures as well as of allowing these elements and contours to approach the outer side 35 of the timing chain 4 comparatively closely. The timing chain 4 can thus be allowed to pass the housing contour 34 in very close proximity. In the most advantageous case, the distance A in the area of the opening 33 is approx. 10 mm (corresponds to the range of 5 to 15 mm). An imaginary connecting line $V_L$ connecting the center points or central axes of the fastening eyelets 22 and 28 intersects, due to this structural design of the guide rail 5, an intermediate contour of the engine block (i.e. of a stationary component). Even very constricted installation space conditions can be optimally utilized in this way.

Figure 5:
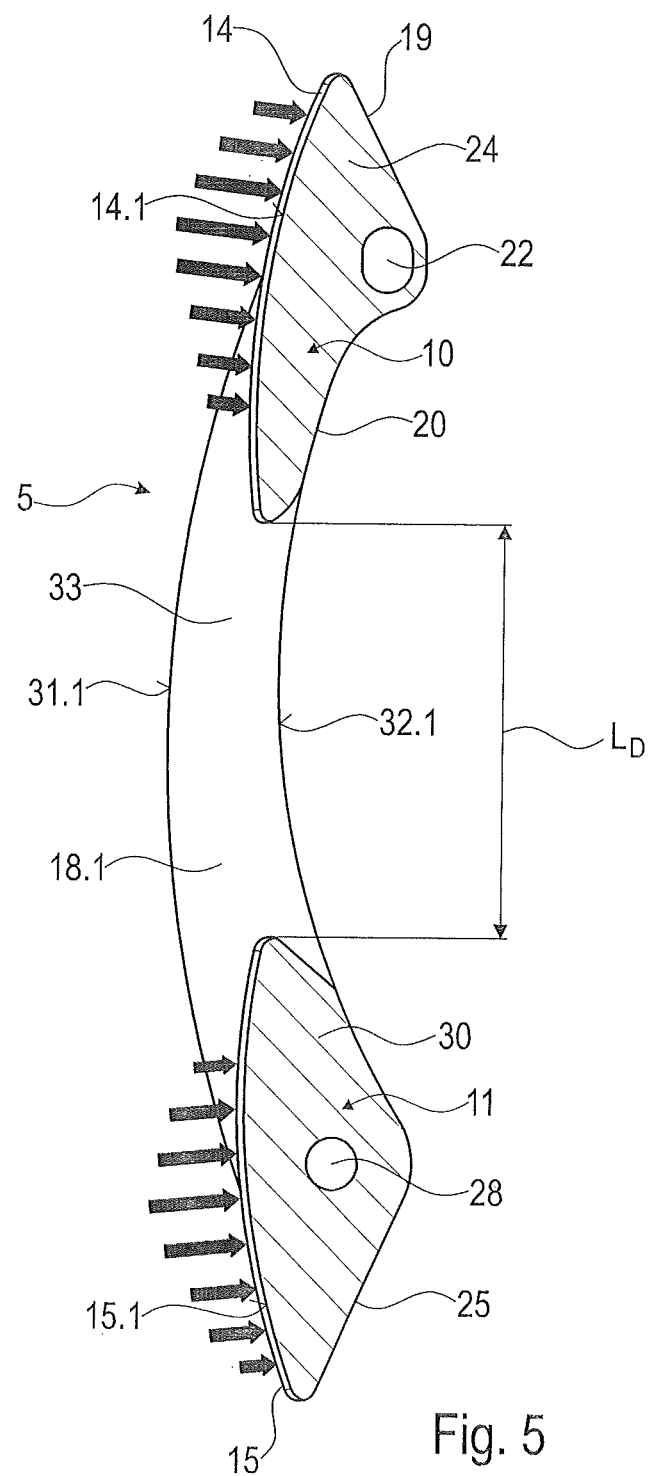
FIG. 5 shows a schematic sectional view of the tensioning rail according to FIG. 2, in which the load distribution is shown.

From FIG. 5 it can also be seen what kind of load distribution takes place in the area of the contact sections 10 and 11. In particular due to the convex shape of the sliding surfaces 14.1 and 15.1, the maximum-load section is located substantially above the fastening eyelets 22 and 28. This load distribution leads to a reduction of the peak forces and, due to the reduced length of the sliding surfaces 14.1 and 15.1, the friction is reduced as well.

Although here not explicitly shown, the construction principle for a guide rail 5 shown in the present connection on the basis of FIGS. 2 to 5 may equally be transferred to a tensioning rail 6. The fastening eyelet in the exit area will then be replaced by a press-on area on the tensioning rail 6 for contact with the tensioning piston 8. Also the tensioning rail 6 has then two spaced-apart contact sections 10, 11 interconnected by means of the non-contact section 12 (in this concrete case the two cheeks 18.1 and 18.2).

LIST OF REFERENCE NUMERALS 1 timing chain drive
2 crankshaft sprocket
3.1 camshaft sprocket
3.2 camshaft sprocket
4 timing chain
5 guide rail
6 tensioning rail
7 chain tensioner
8 tensioning piston
9 wall
10 first contact section
11 second contact section
12 non-contact section
13 support body
14 first sliding lining body
14.1 first sliding surface
15 second sliding lining body
15.1 second sliding surface
16 first support structure
17 second support structure
18.1 cheek
18.2 cheek
19 end wall
20 rear wall
21 front wall
22 fastening eyelet
23 transverse member
24 support wall
25 end wall
26 rear wall
27 front wall
28 fastening eyelet
29 transverse member
30 support wall
31 upper side
32 bottom side
33 opening
34 contour
35 outer side
A=distance
$B_D$=width (opening)
H=height
L=length
$L_D$=length (opening)
$V_L$=connecting line

The invention claimed is:

1. A tensioning or guide rail for a chain drive, in particular for a chain drive of an internal combustion engine, comprising two spaced-apart contact sections and one non-contact section arranged therebetween, the contact sections each having a sliding surface which is adapted to be brought into contact with a chain, and the non-contact section interconnecting the two contact sections as a support structure, wherein the support structure of the non-contact section comprises an opening extending continuously from a front to a rear of the tensioning or guide rail and separating the contact sections provided with the sliding surfaces, two spaced-apart cheeks being provided, which have at least a part of the sliding surfaces of the contact sections between the two spaced-apart cheeks, so that the opening defines a window.

2. The tensioning or guide rail according to claim 1, wherein the support structure of the non-contact section is configured as at least one cheek connected to the contact sections and extends, at least partially, along the sliding surfaces at the side thereof.

3. The tensioning or guide rail according to claim 1, wherein each of the sliding surfaces exhibits a convex curvature in the direction of movement of the chain.

4. The tensioning or guide rail according to claim 3, wherein the cheek(s) is/are configured in an arcuate shape having the same direction of curvature as the sliding surfaces.

5. The tensioning or guide rail according to claim 1, wherein a support body is provided, which comprises support structures of the contact sections as well as the support structure of the non-contact section, and that two sliding lining bodies connected to the support body and providing the respective sliding surface are provided.

6. The tensioning or guide rail according to claim 5, wherein the support body is made of a reinforced plastic material and the sliding lining bodies are made of a plastic material including polyamide without any fiber reinforcement or PTFE.

7. The tensioning or guide rail according to claim 1, wherein a length of the opening corresponds to the length of the tensioning or guide rail in a range of 0.2 to 0.5 times, preferably 0.3 to 0.35 times.

8. The tensioning or guide rail according to claim 1, wherein a width of the opening corresponds to approx. 0.9 to 1.2 times the width of the sliding surface.

9. The tensioning or guide rail according to claim 1, wherein the rail has a meshing side and an exit side and that a height of the cheek(s) increases continuously from the meshing side to the exit side, at least in the area between the contact sections.

10. The tensioning or guide rail according to claim 1, wherein two spaced-apart fastening points or a fastening point and a support point are provided, at least one of the two points being arranged centrally, when seen substantially in the longitudinal direction, on the respective associated contact section.

11. An endless drive, in particular a chain drive of an internal combustion engine, comprising at least two sprockets, a chain wrapped around the sprockets, and at least one tensioning or guide rail according to claim 1.

12. The endless drive according to claim 11, wherein the tensioning or guide rail is arranged at a constriction of the internal combustion engine, so that, in the area of the opening, a stationary component is located in a distance of from 5 to 15 mm, to the chain.

13. The endless drive according to claim 11, wherein the tensioning or guide rail has arranged thereon two fastening points or a fastening point and a support point, and that an imaginary connecting line of these points intersects a stationary component.

* * * * *